United States Patent Office 3,531,456
Patented Sept. 29, 1970

3,531,456
5-ARYLAZO-PYRIMIDINE MONOAZO DYESTUFFS
Hans Ackermann, Werner Bossard, Jacques Voltz, and Hans Wegmuller, Riehen, Switzerland, assignors to J. R. Geigy A.G., Basel, Switzerland
No Drawing. Filed Nov. 8, 1967, Ser. No. 681,551
Claims priority, application Switzerland, Apr. 28, 1967, 6,126/67
Int. Cl. C09b 24/36; D06p 1/02
U.S. Cl. 260—154
9 Claims

ABSTRACT OF THE DISCLOSURE

Dispersible dyes which are 5 - arylazo-pyrimidines wherein the carbon atoms in 2-, 4- and 6-position of the pyrimidine ring are substituted by aliphatically, araliphatically or cycloliphatically mono-substituted amino groups and the arylazo moiety comprises preferably a nitrophenyl radical or a benzothiazole radical; such dyestuffs being distinguished by good affinity especially for polyester fibers, affording dyeings on these fibers which have good fastness properties and especially good light fastness; processes for dyeing polyester fibers with the aforesaid dyestuffs; and compositions containing polyester fiber materials and such dyestuffs.

DESCRIPTION OF THE INVENTION

The present invention concerns new, difficulty water soluble azo dyestuffs which can be used as dispersion dyestuffs, processes for their production, processes for the dyeing of hydrophobic organic fiber material, particularly textile fibers made from linear high molecular esters of aromatic polycarboxylic acids with polyvalent alcohols or from cellulose esters and, as industrial product, the fiber material dyed with the new dyestuffs.

It is common knowledge that a prerequisite for the successful dyeing of polyester fibers—in addition to satisfactory fastness properties both on application and in use—is an excellent drawing power and build up of the dispersion dyestuffs used therefor. However, the dyeing of texturized polyester fiber material, i.e. fabrics made from crimp yarn, e.g. Cimplene, makes great demands of the dyestuffs to be used since, for this purpose, in addition to good fastness properties and sufficient drawing power and build up, very good levelling power of the dyestuffs is imperative.

It has now been found that new, difficulty water soluble dyestuffs which meet the above and other requirements conventionally made of dispersible dyes, are those of the formula

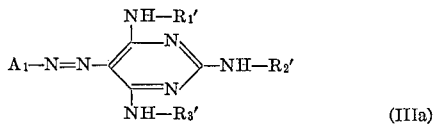

(IIIa)

wherein $A_1$ represents a phenyl radical substituted as follows:
 (a) by, as first substituent, a nitro group;
 (b) by a second substituent selected from hydrogen, nitro, cyano, chlorine, bromine, lower alkyl, lower alkoxy, phenoxy, lower alkylsulfonyl, phenoxpsulfonyl, lower alkylphenoxysulfonyl, lower alkoxycarbonyl, hydroxy-lower alkoxycarbonyl, lower alkoxy-lower alkoxycarbonyl and a substituent of the formula

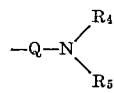

wherein
Q represents —$SO_2$— or —CO—;
$R_4$ represents hydrogen, lower alkyl, hydroxy-lower alkyl, lower alkoxy-lower alkyl, phenyl, benzyl or cyclohexyl; and
$R_5$ represents hydrogen, lower alkyl or hydroxy-lower alkyl; and (c) by a third substituent selected from hydrogen, chlorine or bromine;
One of the groupings —$R_1'$, —$R_2'$ and —$R_3'$ represents alkyl or from 2 to 5 carbon atoms substituted by at least one of the following: hydroxy, lower alkoxy, cyclohexyloxy, benzyloxy, a phenyloxy radical any substituent of which is selected from hydrogen, lower alkyl, lower alkoxy, chlorine and bromine; lower alkanoyloxy, benzoyloxy, lower alkoxy-carbonyloxy, phenyl-sulfonyloxy and lower alkyl-phenyl-sulfonyloxy; and Each of the remaining (R')'s represents lower alkyl, cyclohexyl, benzyl, hydroxy-lower alkyl, lower alkoxy-lower alkyl or lower alkanoyloxy-lower alkyl.

Preferably the aforesaid nitro substituent of $A_1$ is in o- or p-position relative to the azo bridge at the said phenyl radical.

In a second aspect, the invention provides similarly useful dispersible dyestuffs which are of the formula

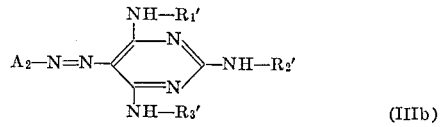

(IIIb)

wherein $A_2$ represents a benzothiazolyl-(2) radical which is unsubstituted or substituted by chlorine, bromine, cyano, nitro, thiocyano, lower alkyl, lower alkoxy, lower alkylsulfonyl, or a grouping

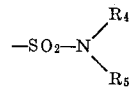

wherein
$R_4$ represents hydrogen, lower alkyl, hydroxy-lower alkyl or lower alkoxy-lower alkyl; phenyl, cyclohexyl or benzyl; and
$R_5$ represents hydrogen, lower alkyl or hydroxy-lower alkyl,
and $R'_1$, $R'_2$ and $R_3$ have the same meanings as in Formula IIIa.

In those dyestuffs of Formula IIIb which contain a substitutent

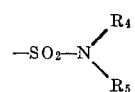

in the benzothiazolyl diazo component, $R_4$ and $R_5$ are preferably lower alkyl groups.

The dyestuffs according to the invention are suitable mainly for the dyeing of hydrophobic, organic fiber material from aqueous dispersion, in particular for the dyeing of textile fibers made from linear high molecular esters of aromatic polycarboxylic acids with polyfunctional alcohols, e.g. made from polyglycol terephthalates, polyglycol isophthalates or polycyclohexane diol terephthalates, or made from cellulose esters, e.g. cellulose-2½-acetate and cellulose triacetate. On these fibers they produce strongly colored greenish yellow, yellow, orange, scarlet, red and brown dyeings which have excellent fastness to washing, milling, sublimation, light, rubbing, perspiration, solvents, crossdyeing, decatising, gas fading and industrial fumes.

Dyestuffs according to the invention can also be used, however, for the dyeing of synthetic polyamide fibers such as nylon, as well as for the dyeing of polyolefins, particularly polypropylene fibers.

Polyglycol terepthalate fibers are dyed with aqueous dispersions of dyestuffs according to the invention preferably at temperatures of over 100° C. under pressure. The dyeing can also be performed at the boiling point of the dye liquor however, in the presence of carriers such as alkali metal phenyl phenolates, polychlorobenzene compounds or similar auxiliaries, or it can be performed by the pad-dyeing process followed by a heat treatment, e.g. thermofixing at 180–220° C. Cellulose-2½-acetate fibers are preferably dyed at temperatures of 80–85° C., whilst cellulose triacetate fibers and synthetic polyamide fiber material are advantageously dyed at the boiling point of the dyebath. The use of carriers is not necessary when dyeing the last mentioned type of fibers. Azo dyestuffs according to the invention can also be used for printing the materials mentioned by the usual methods.

In addition, vegetable and animal fibers, particularly cotton or wool, are very well reserved by the dyestuffs according to the invention. Even on tightly woven fabric or tightly twisted yarns, good and level, penetrated dyeings are obtained with the dyestuffs according to the invention.

Dyestuffs according to the invention, particularly as mixtures of isomers, differ from previously known dyestuffs of similar constitution by their good drawing power and very good build up onto polyglycol terephthalate fibers. In addition, in most cases, dyeings attained with dyestuffs according to the invention have substantially better fastness to light and sublimation.

Dyestuffs according to the invention are also suited for the dyeing of cellulose acetates, polyglycol terepthalates and polyamides in the mass. Because of their good solubility in organic solvents such as acetone or chloroform, they can also be used in lacquers and printing inks.

The azo dyestuffs of Formula IIIa and other dyestuffs of similar structure, but some of which are less easily producible, and which are generally of inferior light fastness are obtained by coupling the diazonium compound of an amine of the formula

with a coupling component of the formula

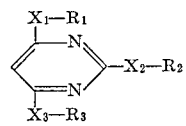

to form an azo dyestuff of the formula

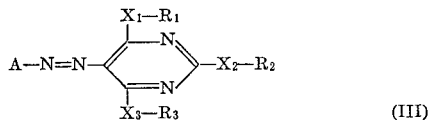

In this coupling, the starting materials should be so chosen that the azo dyestuff obtained contains no ionogenic groups forming salts in water, i.e. it contains neither groups which dissociate acid in water such as sulphonic acid, carboxylic acid or phosphoric acid groups, nor onium groups such as ammonium or sulphonium groups.

In the Formulae I, II and III:

A represents a carbocyclic or heterocyclic aryl radical, each of $X_1$, $X_2$ and $X_3$ represents the —NH— bridge, and of $R_1$, $R_2$ and $R_3$ at least one R represents a radical of the formula —alk—O—Z— wherein —alk— represents an optionally substituted alkylene radical and Z represents hydrogen, an acyl radical or an optionally substituted hydrocarbon radical, and the other R's each represent an optionally substituted alkyl, cycloalkyl or aralkyl group.

When A is a carbocyclic aryl radical, then this is a mono- or poly-nuclear, condensed or non-condensed, particularly an unsubstituted or non-ionogenically substituted phenyl or naphthyl radical. Preferably A is a phenyl radical non-ionogenically substituted by electron attracting substituents. Examples of electron attracting, non-ionogenic substituents are: halogens such as fluorine, chlorine or bromine; the cyano, thiocyano, nitro, trifluoromethyl group; also acyl groups, particularly carbacyl groups such as low alkanoyl or alkenoyl groups, further the aroyl groups such as the benzoyl group, or organosulphonyl groups such as low alkylsulphonyl or arylsulphonyl groups, also sulphonic acid aryl ester groups such as the sulphonic acid phenyl ester, alkylphenyl ester or halogenophenyl ester groups; carboxylic acid ester groups, e.g. the carbophenoxy group, particularly however, carbalkoxy groups such as the carbomethoxy, carboethoxy, carboisopropoxy or carbobutoxy group; the sulphonic acid or carboxylic acid amide group; N-mono- or N,N-disubstituted carbamoyl or sulphamoyl groups having a phenyl group and/or alkyl, hydroxyalkyl, acyloxyalkyl substituents, particularly low alkanoyloxyalkyl, alkoxyalkyl, cyanoalkyl or cycloalkyl or phenylalkyl substituents. All these groups can also be further substituted non-ionogenically. However, in addition to the preferred, electron attracting substituents, the radical A can also contain non-ionogenic electron emitting substituents, e.g. low aliphatic, optionally non-ionogenically substituted, e.g. hydroxy substituted, hydrocarbon groups, optionally non-ionogenically substituted low alkoxy groups such as methoxy, ethoxy or ethoxycarbonylmethoxy groups, optionally non-ionogenically substituted aryloxy groups such as the phenoxy group and the alkyl or halogen substituted phenoxy groups, or acylamino groups, particularly carbacylamino groups, e.g. low alkanoylamino groups such as the acetylamino, aroylamino group such as the benzoylamino group, or also low alkylsulphonylamino groups such as the methylsulphonylamino group, or arylsulphonylamino groups such as the phenylsulphonylamino group.

When A is a naphthyl radical, it can be both an unsubstituted as well as a non-ionogenically substituted 1- or 2-naphthyl radical. Substituents in this case are mainly low alkyl and alkoxy groups, halogens such as chlorine or bromine, optionally N-substituted sulphonic acid amide groups, sulphonic acid low alkyl ester or low aryl ester groups, low alkylsulphonyl or arylsulphonyl groups.

When A contains an arylazo group, the azo groups in an aromatic homocycle preferably are in the p-position. The arylazo group is preferably unsubstituted; however, it can also be substituted by halogens such as fluorine, chlorine or bromine, or by low alkyl, low alkoxy groups or by the nitro group. These substituents are ring substituents. If A is e.g. a phenylazophenyl radical, then the phenylene radical can also contain further substituents, e.g. low alkyl or alkoxy groups, halogens such as fluorine, chlorine or bromine, or acylamino groups such as low alkanoylamino groups.

When A is a heterocyclic aryl radical then it is mainly radicals of 5- or 6-membered, particularly N-containing, heterocycles of, e.g. the pyrazole, thiazole, oxidazole, thiodiazole, triazole or pyridine series. It can also be radicals of mononuclear condensed heterocycles which then, preferably, have a fused benzene ring, such as optionally non-ionogenically substituted benzothiazole, indazole or quinoline rings. These mono- or poly-nuclear heterocyclic aryl radicals can also contain non-ionogenic substituents of the type listed above which are usual in azo dyestuffs, particularly halogens, pseudohalogens such as cyano or thiocyano groups, nitro groups, lower alkyl, lower alkoxy, phenyl groups, lower alkylsulphonyl groups and sulphonic acid amide groups optionally substituted by lower alkyl or dialkyl groups.

Preferred azo dyestuffs according to the invention are those falling under Formulas IIIa and IIIb which are produced by using diazonium compounds of amines of Formula I wherein A represents, (1) a phenyl radical having a nitro group in o- and/or p-position to the azo group, which phenyl radical is optionally substituted by other non-ionogenic, preferably electron attracting substituents, or (2) a benzothiazolyl-(2) radical optionally substituted by halogens, cyano, thiocyano, lower alkyl, lower alkoxy or lower alkylsulphonyl groups.

In order to attain the desired sublimation fastness properties and very good levelling power and build-up, at least one R in the azo dyestuffs of Formula III according to the invention must be the characteristic group —alk—O—Z The alkylene group —alk— can be straight or branched chained; in the former case it is preferably the 1,2-ethylene or 1,3-propylene group, in the latter case it is the 1,2-propylene or 1,2-butylene group. Such divalent radicals can be substituted, e.g. by phenyl or lower alkoxy groups such as the methoxy or ethoxy group.

As acyl radical, Z is particularly a lower, unsubstituted or non-ionogenically substituted alkanoyl group the alkanoyl moiety of which preferably has 2 to 4 carbon atoms. As nonionogenic substituents, the alkanoyl group can contain, e.g. halogens such as chlorine or bromine, or lower alkoxy groups such as the methoxy or ethoxy group.

As hydrocarbon radical, Z represents, e.g. a straight or branched chain alkyl radical having, preferably, 1 to 4 carbon atoms, a cycloalkyl radical such as the cyclohexyl or methyl-cyclohexyl radical, an aralkyl radical, particularly a phenylalkyl radical such as the benzyl radical, or a homocyclic aryl radical such as the phenyl radical. When these hydrocarbon radicals are substituted, then examples of substituents are halogens such as fluorine, chlorine or bromine, cyano groups, phenyl groups, hydroxyl groups, lower alkoxy groups or phenoxy groups. Preferably, however, Z is hydrogen.

When each of $R_1$, $R_2$ and $R_3$ represents an alkyl radical then this can have up to 12, preferably 1 to 5 carbon atoms and the chain can be straight or branched. If this alkyl radical is substituted, examples of substituents are the hydroxyl group, alkoxy groups such as unsubstituted alkoxy, alkoxyalkoxy or alkoxyalkoxyalkoxy groups or alkoxycarbonyl groups, in each of which the alkoxy unit preferably has 1 to 4 carbon atoms, also acyloxy groups, particularly lower alkanoyloxy groups such as the acetyloxy or propionyloxy groups, phenyl groups, phenoxy groups, cyano groups or halogens such as fluorine, chlorine or bromine. Cycloalkyl or aralkyl radicals symbolised by $R_1$, $R_2$ and $R_3$ are, e.g. the cyclohexyl or methylcyclohexyl groups or phenylalkyl groups such as the benzyl group, the benzene nuclei of which can contain the non-ionogenic substituents, particularly lower alkyl or alkoxy groups, listed above for A.

Particularly valuable azo pyrimidine dyestuffs which are distinguished, among other things, by very easy accessibility, good fastness properties and very great affinity to polyglycol terephthalate fibers as well as good stability in a boiling bath, are thus derived from pyrimidine coupling components of the formula

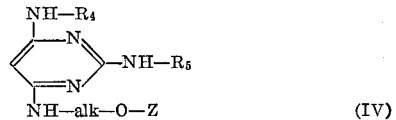

wherein $R_4$ and $R_5$ independently of each other, each represent an alkyl radical optionally substituted by hydroxy, alkoxy or acyloxy groups, and the radical —alk—O—Z has the meaning given above.

The pyrimidine compounds of Formula II usable as coupling components according to the invention are produced by reacting the three chlorine atoms of the 2,4,6-trichloro-pyrimidine one after the other with primary aliphatic, cycloaliphatic or aralophatic amines as defined or with a metal salt of an aliphatic, cycloaliphatic or arali- phatic hydroxyl or mercapto compound as defined. Preferably, less reactive amines are used in the first step, and, in the second and third steps, more easily reactive, more strongly basic amines, alcoholates or mercaptides are used in any order desired. The products resulting from the first step are generally mixtures of isomers of 2-amino-4,6-dichloro-pyrimidines and 4-amino-2,6-dichloro-pyrimidines which can be separated, if desired, by recrystallisation or by chromatographic adsorption, e.g. on aluminum oxide.

Preferably, however, the mixtures of isomers are used as they yield mixtures of azo pyrimidine dyestuffs according to the invention which are distinguished by unexpectedly good build up.

The step-wise reaction is performed, e.g. in aqueous, organic or organic-aqueous solution or dispersion, optionally in the presence of acid binding agents such as alkali and alkaline earth carbonates or oxides, or tertiary nitrogen bases. Suitable organic solvents are, e.g. alcohols such as methanol or ethanol, ethylene glycol monomethyl ether or monoethyl ether, preferably however, aliphatic ketones such as acetone, methylethyl ketone or methylisobutyl ketone, cyclic ethers, e.g. dioxane and tetrahydrofuran, or optionally halogenated or nitrated aromatic hydrocarbons such as toluene, xylenes, chlorobenzene or nitrobenzene.

The reaction of the first chlorine atom of the 2,4,6-trichloro-pyrimidine is performed at low temperatures, advantageously at 20–60° C., the second chlorine atom is reacted at moderate temperatures, preferably at 70–100° C., and the third chlorine atom is reacted at higher temperatures, preferably between 100 and 180° C., optionally in a closed reaction vessel.

If, in the pyrimidine coupling components of Formula II usable according to the invention, one R of $R_1$, $R_2$ and $R_3$ represents a radical of the formula —alk—OH and the other R's each represent an alkyl radical containing, as non-ionogenic groups, optionally one or more hydroxyl groups, then these hydroxyl groups can be subsequently acylated. Acylating agents for this purpose are the anhydrides or lower carboxylic acids such as acetic anhydride or propionic acid anhydride, acyl chlorides and bromides of the aliphatic and aromatic series, e.g. acetyl chloride, propionyl chloride or benzoyl chloride or bromide, also chloroformic or bromoformic acid esters, particularly chloroformic or bromoformic acid methyl or ethyl ester.

The diazonium compound of an amine of Formula I is coupled with the coupling component of Formula II by the usual methods, preferably in mineral acid to weakly acid aqueous medium, in particular at a pH value of 4–4.5. When the coupling is performed in a mineral acid medium, advantageously the acid is gradually buffered, e.g. with alkali metal salts of lower fatty acids. In many cases, the coupling of a mixture of isomers of pyrimidine coupling components usable according to the invention in particular with a suitable diazonium compound has proved to be very advantageous.

A modification of the process according to the invention for the production of difficultly water soluble azo dyestuffs of Formula III wherein of $R_1$, $R_2$ and $R_3$, at least one R represents an alkyl radical substituted by acyloxy groups, consists in reacting a compound of the formula

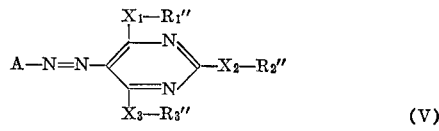

wherein:

A represents preferably $A_1$ or $A_2$, of $R_1''$, $R_2''$ and $R_3''$, one R'' represents a radical of the formula —alk—OH and the other two (R'')'s represent the aforesaid radical or an unsubstituted alkyl group, a substituted alkyl group different therefrom or an optionally substituted cycloalkyl or aralkyl group, and $X_1$, $X_2$, $X_3$ and —alk— have the meanings given above, with an acylating agent, the starting materials being so chosen that the end dyestuff contains no ionogenic groups forming salts in water.

Azo compounds of Formula V are obtained, e.g. by coupling the diazonium compound of an amine of Formula I with the corresponding pyrimidine coupling component, the coupling being performed in the manner described above. Suitable acylating agents for the acylating of azo compounds of Formula V usable according to the invention are, e.g. those mentioned above.

The acylation is performed advantageously at a raised temperature in a suitable organic solvent such as glacial acetic acid, chlorobenzene or dioxane, optionally in the presence of an acid binding agent such as sodium acetate or pyridine.

The dyestuffs according to the invention are brought into a finely distributed form by milling with surface active dispersing agents. Suitable dispersing agents are, e.g. anionic ones such as alkali metal salts of sec. higher alkylaryl sulphonates, alkali metal salts of condensation products of formaldehyde with naphthalene sulphonic acids, lignin sulphonates, or non-ionogenic dispersing agents such as fatty alcohol polyglycol ethers.

In this specification and the appended claims the term "lower" (or "low") used in connection with aliphatic radicals means groups containing not more than 5 carbon atoms.

The following non-limitative examples illustrate the invention further. The temperatures are given therein in degrees centigrade and parts and percentages are given by weight unless expressly stated otherwise. "Polyglycol terephthalate" represents the products known under the trade names Terylene, Vycron, Dacron and Trevira.

EXAMPLE 1

23 g. of 1-amino-2-nitro-4-ethylsulphonyl-benzene are dissolved in 150 g. of 80% sulphuric acid and, at 20–30°, the solution is diazotized with an amount of nitrosyl sulphuric acid corresponding to 6.9 g. of sodium nitrite. The diazonium salt solution so obtained is added dropwise, at 0–8°, to a solution of 22.5 g. of 2,4-bis-ethylamino-6-(β-hydroxy-ethylamino)-pyrimidine in 250 g. of 80% acetic acid, 150 g. of methanol and 300 g. of water. On completion of the coupling, the ochre coloured precipitate which has separated, the composition of which corresponds to the formula

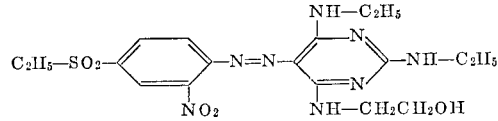

is separated by filtration, washed with a large quantity of water and then dried at 60–70° under reduced pressure. 10 g. of the dyestuff so obtained are brought into a finely dispersable form by milling with 10 g. of a condensation product of naphthalene-2-sulphonic acid and formaldehyde and 10 g. of a lignin sulphonate.

Polyglycol terephthalate fibres can be dyed with this dye preparation from aqueous dispersion, optionally in the presence of a carrier such as trichlorobenzene, in pure orange shades. The dyeings have very good fastness to washing, perspiration, rubbing, sublimation and light.

The 2,4-bis-ethylamino - 6 - (β-hydroxy-ethylamino)-pyrimidine used in this example as coupling component is obtained, e.g. by reacting 2,4,6-trichloro-pyrimidine with excess ethylamine at 70–90° and condensing the 2,4-bis-ethylamino - 6 - chloropyrimidine resulting from this reaction with β-hydroxy-ethylamine at a temperature of 140–160°. Dyestuffs having similar good properties are obtained if an equivalent amount of each of the diazo components given in column 2 of the following Table I is coupled under the conditions described in the above example with the equivalent amount of one of the coupling components given in column 3.

TABLE I

| Example No. | Diazo component | Coupling component | Shade on polyglyco terephthalate fibres |
|---|---|---|---|
| 2 | 1-amino-2,4-dinitro-6-chlorobenzene | 2,4-bis-ethylamino-6-(β-hydroxy-ethylamino)-pyrimidine | Yellowish red. |
| 3 | 2-amino-6-methoxybenzthiazole | do | Yellowish orange. |
| 4 | do | 2,4-bis(β-hydroxy-ethylamino)-6-ethylamino-pyrimidine | Orange. |
| 5 | 1-amino-2,6-dichloro-4-nitrobenzene | do | Do. |
| 6 | 2-amino-5-nitrothiazole | do | Yellowish red. |
| 7 | 2-amino-5-methylthiodiazole | 2,4-bis-ethylamino-6-(β-hydroxyethylamino)-pyrimidine | Reddish yellow. |
| 8 | 2-amino-triazole | do | Yellow. |
| 9 | 5-amino-1-phenyl-3-methyl-pyrazole | do | Do. |
| 10 | 3-amino-pyridine | do | Do. |
| 11 | 2-methyl-4-aminoquinoline | do | Scarlet. |
| 12 | 1-amino-4-nitrobenzene | 17.2 g. 2-ethylamino-4-benzylamino-6-(β-hydroxy-ethylamino)-pyrimidine; 11.5 g. 2-benzylamino-4-ethylamino-6-(β-hydroxy-ethylamino)-pyrimidine. | Orange. |
| 13 | do | 2-isopropylamino-4-cyclohexylamino-6-(β-hydroxy-ethylamino)-pyrimidine. | Do. |
| 14 | 1-amino-2-chloro-4-nitrobenzene | 2,4-bis-butylamino-6-(γ-hydroxy-propylamino)-pyrimidine | Do. |
| 15 | 1-amino-2,6-dichloro-4-nitrobenzene | 2,4-bis-ethylamino-6-(β-phenyl-β-hydroxy-ethylamino)-pyrimidine | Brown-yellow. |
| 16 | 1-amino-2-nitro-4-methylsulphonylbenzene | 2,4-bis-methylamino-6-(β-hydroxy-γ-butoxy-propylamino)-pyrimidine. | Orange. |

EXAMPLE 17

21.8 g. of 1-amino-2,4-dinitro-6-chlorobenzene are dissolved in 200 g. of concentrated sulphuric acid and, at 20–30°, the solution is diazotised with an amount of nitrosyl sulphuric acid corresponding to 6.9 g. of sodium nitrite. The diazonium salt solution prepared in this way is added dropwise, at 0–10°, to a solution of 26.7 g. of 2,4-bis-ethylamino-6-(β-acetoxy-ethylamino)-pyrimidine in 75 g. of ethylene glycol monoethyl ether, 100 g. of 36% hydrochloric acid and 500 g. of water. The coupling mixture is then stirred for 2 hours at 0–5°. The precipitated dyestuff, the composition of which corresponds to the formula

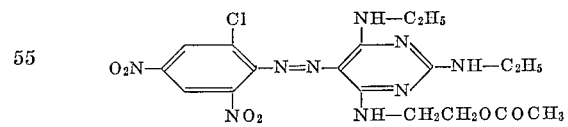

is then collected on a filter and washed with a large quantity of water. The dyestuff is dried in vacuo at 60–70° and afterwards milled up with a mixture of lignin sulphonate and the sodium salt of the condensation product of naphthalene-2-sulphonic acid and formaldehyde. The pure scarlet dyeings on polyglycol terephthalate or cellulose triacetate fibres attained with this dye preparation in aqueous dispersion, optionally in the presence of a carrier such as the sodium salt of o-phenylphenol have very good fastness to washing, perspiration, decatising, rubbing and light.

The 2,4-bis-ethylamino - 6 - (β - acetoxy-ethylamino)-pyrimidine used as coupling component in this example is obtained, e.g. by acetylating the 2,4-bis-ethylamino-6-β-hydroxy-ethylamino-pyrimidine described in Example 1. The acetylation is preferably performed in an inert solvent such as chlorobenzene, with acetic anhydride at a temperature of about 70–90°. Another process for the production of the dyestuff described in this example consists in slurrying 10 g. of the coupling product produced according to Example 1 in 50 g. of glacial acetic acid and reacting with 10 g. acetic anhydride at a temperature of 70–80°.

EXAMPLE 18

18.3 g. of 1-amino-2,4-dinitrobenzene are dissolved in 100 g. of concentrated sulphuric acid and, at 20–25°, the solution is diazotised with an amount of nitrosyl sulphuric acid corresponding to 6.9 g. of sodium nitrite. The diazonium salt solution so obtained is added dropwise, at 0–5°, to a solution of a mixture of 16.4 g. of 2-methylamino-4-benzylamino-6-(β-hydroxy-ethylamino) - pyrimidine and 10.9 g. of 2-benzylamino-4-methylamino-6-(β-hydroxy-ethylamino)-pyrimidine in 300 g. of 80% acetic acid, 5 g. of cetyl polyglycol ether and 400 g. of water. On completion of the coupling, the separated dyestuff precipitate, the composition of which corresponds to the formulae

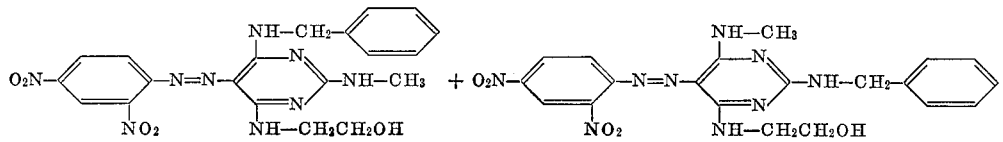

is separated by filtration, washed with a large quantity of water and then dried in vacuo in the usual way at 60–70°. 5 g. of the dyestuff mixture so obtained are brought into a finely dispersable form by milling with 15 g. of a lignin sulphonate.

Polyglycol terephthalate fibres dyed in clear scarlet shades are obtained with this dye preparation in aqueous dispersion, optionally in the presence of a carrier such as the sodium salt of o-phenyl-phenol. The dyeings have very good fastness to washing, perspiration, rubbing, light and sublimation.

The mixture, consisting of 2-methylamino-4-benzylamino-6-(β-hydroxy-ethylamino)-pyrimidine and 2-benzylamino-4-methylamino-6-(β-hydroxy-ethylamino) - pyrimidine used in this example as coupling component is obtained, e.g. by reacting 2,4,6-trichloropyrimidine with one equivalent of benzylamine to form a mixture of 4-benzylamino - 2,6 - dichloro-pyrimidine and 2-benzylamino-4,6-dichloro-pyrimidine, condensing this reaction product with one equivalent of methylamine at 70–90° to form a mixture of 2-methylamino-4-benzylamino-6-chloro-pyrimidine and 2 - benzylamino-4-methylamino-6-chloro-pyrimidine and then reacting the two components with excess β-hydroxy-ethylamine at a temperature of 140–160°.

By using in lieu of the above mixed coupling component equivalent amounts of the individual pyrimidine components (a) 2-methylamino-4-benzylamino - 6 - (β - hydroxyethylamino)-pyrimidine,
(b) 2-benzylamino-4-methylamino - 6 - (β - hydroxyethylamino)-pyrimidine, or
(c) 2-benzylamino-4-(β-hydroxyethylamino) - 6 - methylamino-pyrimidine, and otherwise following the procedure given in Example 18, dyestuffs of similar shades and dyeing properties as those described above are obtained.

The aforesaid pyrimidines named under (a), (b) and (c) are produced in the same manner as described in Examples 195, 196 and 197 of our co-pending application Ser. No. 681,554 filed of even date herewith, but using in lieu of aniline an equivalent amount of benzylamine and in lieu of ethylamine an equivalent amount of methylamine.

EXAMPLE 19

18 g. of 2-amino-6-methoxy-benzothiazole in 100 g. of concentrated sulphuric acid are diazotised at −5° with nitrosyl sulphuric acid corresponding to 6.9 g. of sodium nitrite. The prepared diazonium salt solution is added dropwise, at 0–5°, to a solution of 30.1 g. of 2,4-bis-ethylamino-6-(β-phenoxy-ethylamino)-pyrimidine in 400 g. of 80% acetic acid and 400 g. of water. The pH of the coupling mixture is then raised to 4–4.5 by the addition of sodium acetate. On completion of the coupling, the precipitated red coloured coupling product is filtered off, washed with water and then dried in the usual way. 10 g. of the dyestuff so obtained, the composition of which corresponds to the formula

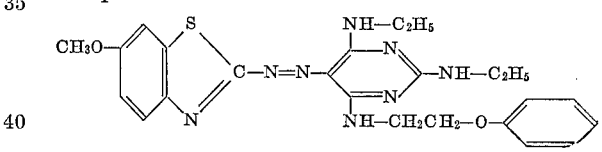

are brought into a finely dispersable form by milling with 25 g. of a lignin sulphonate. Polyglycol terephthalate fibers can be dyed in pure orange shades with this preparation from aqueous dispersion, optionally in the presence of a carrier such as the sodium salt of o-phenylphenol. The dyebath is substantially exhausted. The dyeings have very good fastness to washing, perspiration, light, rubbing and sublimation.

The 2,4-bis-ethylamino - 6 - (β-phenoxy-ethylamino)-pyrimidine used in this example as coupling component is obtained, e.g. by reacting 2,4-bis-ethylamino-6-chloro-pyrimidine with β-phenoxy-ethylamine at a temperature of 140–160°.

Dyestuffs having similar properties are obtained if the diazo components given in column 2 of the following Table II are coupled with one of the coupling components given in column 3 under the conditions described in the above example.

TABLE II

| Example No. | Diazo component | Coupling component | Shade on polyglycol terephthalate fibres |
|---|---|---|---|
| 20 | 1-amino-4-methylsulphonyl-benzene | 2,4-bis-propylamino-6-(γ-methoxy-propylamino)-pyrimidine | Yellow. |
| 21 | 1-amino-2-nitro-4-methoxybenzene | 2,4-bis-methylamino-6-(β-benzyloxy-ethylamino)-pyrimidine | Red. |
| 22 | 1-amino-2,4-dinitro-6-bromobenzene | 2,4-bis-(β-acetoxy-ethylamino)-6-ethyl-imino-pyrimidine | Yellowish red. |
| 23 | 2-amino-6-cyanobenzothiazole | do | Reddish orange. |
| 24 | 2-amino-6-rhodanobenzothiazole | do | Do. |
| 25 | 1-amino-2-nitrobenzene | 2,4,6-tris-(β-acetoxy-ethylamino)-pyrimidine | Orange. |
| 26 | 1-amino-2-nitrobenzene-4-sulphonic acid-phenylamide | 2,4,6-tris-(β-acetoxy-ethylamino)-pyrimidine | Do. |
| 27 | 1-amino-4-n trobenzene | 2,4-bis-benzylamino-6-(γ-methoxy-propylamino)-pyrimidine | Do. |
| 28 | 2-amino-6-methylsulphonyl-benzothiazole | 2,4-bis-(β-acetoxy-ethylamino)-6-ethyl-amino-pyrimidine | Reddish orange. |
| 29 | 2-amino-benzothiazole-6-sulphonic acid-N,N-diethylamide | do | Do. |
| 30 | 2-amino-benzothiazole | do | Do. |
| 31 | 2-amino-6-chlorobenzothiazole | do | Do. |
| 32 | 2-amino-6-bromobenzothiazole | do | Do. |
| 33 | 2-amino-6-nitrobenzothiazole | do | Do. |

By repeating Example 1, but using in lieu of 1-amino-2-cyano-4-nitrobenzene employed therein an equivalent amount of an amine of the formula

used therein an equivalent amount of a coupling component of the formula

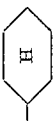

wherein $Q_1$, $Q_2$ and $Q_3$ represent the substituents given in the respectively entitled columns of the following Table III, and in lieu of the pyrimidine coupling component tained the correspondingly substituted dyestuffs of the formula which dye polyglycol terephthalate fibers in the shades given in the last column of Table III, the resulting dyeings having the fastness properties described hereinbefore. The cyclohexyl radical is represented by

H wherein $Y_1$, $Y_2$ and $Y_3$ have the meanings given in the respectively headed columns of Table III, there are obtained

TABLE III

| Example No. | $Q_1$ | $Q_2$ | $Q_3$ | $Y_1$ | $Y_2$ | $Y_3$ | Shade on polyglycol terephthalate fibers |
|---|---|---|---|---|---|---|---|
| 34 | $-NO_2$ | $-SO_2N\begin{smallmatrix}CH_3\\CH_2CH_2OH\end{smallmatrix}$ | $-H$ | $-NH-CH_2CH_2OH$ | $-NHC_3H_7$ | $-NH-CH_3$ | Orange. |
| 35 | $-SO_2N\begin{smallmatrix}CH_3\\CH_2CH_2OH\end{smallmatrix}$ | $-NO_2$ | $-H$ | $-NH-CH_2CH_2OH$ | $-NHC_3H_7$ | $-NH-CH_3$ | Do. |
| 36 | $-CON(C_2H_5)_2$ | $-NO_2$ | $-H$ | $-NH-CH_2CH_2OCH_3$ | $-NH-CH_2-$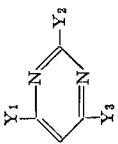 | $-NH-CH_3$ | Do. |
| 37 | $-CONH-CH_3$ | $-NO_2NH_2$ | $-H$ | $-NH-CH_2CH_2OH$ | $-NH-CH_2CH_2OH$ | $-NH-C_2H_5$ | Do. |
| 38 | $-NO_2$ | $-CONH-CH_3$ | $-H$ | $-NH-CH_2CH_2OH$ | $-NH-CH_2CH_2OH$ | $-NH-C_2H_5$ | Do. |
| 39 | $-NO_2$ | $-CONH-$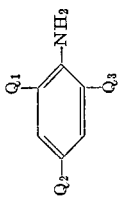 | $-H$ | $-NH-CH_2CH_2OH$ | $-NH-CH_2CH_2OH$ | $-NH-C_2H_5$ | Do. |
| 40 | $-NO_2$ | $-CONH-CH_2-$ | $-H$ | $-NH-CH_2CH_2OH$ | $-NH-CH_2CH_2OH$ | $-NH-C_2H_5$ | Do. |
| 41 | $-NO_2$ | $-CON\begin{smallmatrix}CH_3\\CH_2CH_2OH\end{smallmatrix}$ | $-H$ | $-NH-CH_2CH_2O-$ | $-NH-CH_3$ | $-NH-CH_3$ | Do. |
| 42 | $-NO_2$ | $-CONH-$H | $-H$ | $-NH-CH_2CHCH_2OH$ OH | $-NH-CH_2CH_2OH$ | $-NH-C_2H_5$ | Do. |
| 43 | $-NO_2$ | $-O-$ | $-H$ | $-NH-CH_2CHCH_2OH$ OH | $-NH-C_2H_5$ | $-NH-C_2H_5$ | Do. |
| 44 | $-Br$ | $-NO_2$ | $-Br$ | $-NH-CH_2-$ | $-NHCH_2CH_2OH$ | $-NH-CH_2CH_2OH$ | Do. |

TABLE III—Continued

| Example No. | Q$_1$ | Q$_2$ | Q$_3$ | Y$_1$ | Y$_2$ | Y$_3$ | Shade on polyglycol terephthalate fibers |
|---|---|---|---|---|---|---|---|
| 45 | —NO$_2$ | —SO$_2$O—C$_6$H$_5$ | —H | —NH—CH$_2$CH$_2$CH$_2$OH | —NH—C$_2$H$_5$ | —NH—C$_2$H$_5$ | Orange. |
| 46 | —NO$_2$ | —SO$_2$O—C$_6$H$_4$—CH$_3$ | —H | —NH—CH$_2$CH$_2$CH$_2$OH | —NHCH$_3$ | —NH—CH$_3$ | Do. |
| 47 | —NO$_2$ | —COOC$_2$H$_5$ | —H | —NH—CH$_2$CH$_2$OCOOC$_2$H$_5$ | —NHCH$_3$ | —NH—CH$_3$ | Do. |
| 48 | —COOCH$_2$CH$_2$OH | —NO$_2$ | —H | —NHCH$_2$CH$_2$OCO—C$_6$H$_5$ | —NHCH$_3$ | —NH(CH$_2$)$_3$OCH$_3$ | |
| 49 | —COOCH$_2$CH$_2$OCH$_3$ | —NO$_2$ | —H | —NHCH$_2$CH$_2$OSO$_2$—C$_6$H$_5$ | —NH—C$_2$H$_5$ | —NH—C$_2$H$_5$ | Do. |
| 50 | —NO$_2$ | —SO$_2$NH$_2$ | —H | —NH—C$_3$H$_7$ | —NH—CH$_2$CH$_2$OSO$_2$—C$_6$H$_4$—CH$_3$ | —NH—C$_3$H$_7$ | Do. |
| 51 | —NO$_2$ | —SO$_2$NHCH$_3$ | —H | —NH—CH$_2$CH$_2$O—C$_6$H$_5$ | —NH—C$_2$H$_5$ | —NH—C$_2$H$_5$ | Do. |
| 52 | —NO$_2$ | —SO$_2$NHCH$_2$CH$_2$OH | —H | —NHCH$_2$CH$_2$OCOCH$_3$ | —NHCH$_2$CH$_2$OCOCH$_3$ | —NH—C$_2$H$_5$ | Do. |
| 53 | —NO$_2$ | —SO$_2$NH(CH$_2$)$_3$OCH$_3$ | —H | —NHCH$_2$CH$_2$OC$_2$H$_5$ | —NHCH$_2$CH$_2$OC$_2$H$_5$ | —NHC$_2$H$_5$ | Do. |
| 54 | —NO$_2$ | —SO$_2$NH—C$_6$H$_5$ | —H | —NH—CH$_2$CH$_2$OC$_2$H$_5$ | —NHCH$_2$CH$_2$OC$_2$H$_5$ | —H | Do. |
| 55 | —NO$_2$ | —SO$_2$NH—CH$_2$—C$_6$H$_5$ | —H | —NH—CH$_2$CH$_2$OC$_2$H$_5$ | —NH—C$_2$H$_5$ | —CH$_2$—C$_6$H$_5$ | Do. |
| 56 | —H | —NO$_2$ | —H | —NH—C$_2$H$_5$ | —NH—C$_2$H$_5$ | —NHCH$_2$CH$_2$OH | Do. |
| 57 | —CN | —NO$_2$ | —H | —NH—C$_2$H$_5$ | —NH—C$_2$H$_5$ | —NHCH$_2$CH$_2$OH | Do. |
| 58 | —CH$_3$ | —Cl | —H | —NH—C$_2$H$_5$ | —NH—C$_2$H$_5$ | —NHCH$_2$CH$_2$OH | Do. |
| 59 | —NO$_2$ | —NO$_2$ | —H | —NH—C$_2$H$_5$ | —NH—C$_2$H$_5$ | —NHCH$_2$CH$_2$OH | Do. |
| 60 | —H | —NO$_2$ | —H | —NHCH$_2$CH$_2$O—C$_6$H$_4$—CH$_3$ | —NH—C$_2$H$_5$ | —NHCH$_2$CH$_2$OH | Do. |
| 61 | —H | —NO$_2$ | —H | —NH—CH$_2$CH$_2$O—C$_6$H$_4$—Cl | —NH—C$_2$H$_5$ | —NHCH$_2$CH$_2$OH | Do. |
| 62 | —H | —NO$_2$ | —H | —NH—(CH$_2$)$_2$O—C$_6$H$_4$—OCH$_3$ | —NH—CH$_3$ | —NH—CH$_3$ | Do. |

EXAMPLE 63

18 g. of the dyestuff prepared according to Example 1 are suspended in 100 g. of glacial acetic acid. 15 g. of acetic acid anhydride are then added to the finely suspended dyestuff and heated at 80–90° for 4 hours. Subsequently the reaction mixture is allowed to cool, 50 g. of methyl alcohol are added to hydrolyze the excess acetic acid anhydride, and the mixture is stirred over night at 20–25°. Then the orange dyestuff, which precipitates and whose composition corresponds to the formula

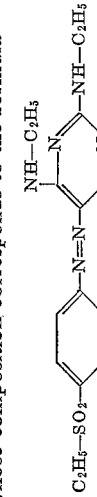

is separated by suction filtration and dried as usual. 10 g. of the dyestuff thus obtained are finely ground with 30 g. of a lignin sulfonate. Polyglycol terephthalate fibers are dyed with this preparation, optionally with the addition of a swelling agent in pure orange shades. The fabric is very well penetrated and the dyeings are very light-fast.

EXAMPLE 64

2 g. of the dyestuff obtained according to Example 56 are dispersed in 4000 g. of water, 12 g. of sodium-o-phenylphenolate are added to this dispersion as carrier and also 12 g. of diammonium phosphate are added, and 100 g. of polyglycol terephthalate yarn are dyed for 1½ hours at 95–98°. The dyeing is rinsed and after-treated with dilute sodium hydroxide solution and a dispersing agent.

In this way, a pure orange dyeing which is fast to washing, light and sublimation is obtained.

If in the above example, the 100 g. of polyglycol terephthalate yarn are replaced by 100 g. of cellulose triacetate fabric, dyeing is performed under the conditions given and then the dyeing is rinsed with water, an orange dyeing is obtained which has very good fastness to washing and sublimation.

EXAMPLE 65

Polyglycol terephthalate fabric is impregnated in a padding mangel at 40° with a liquor of the following composition:

35 parts by weight of the dyestuff obtained according to Example 2, finely dispersed in
7.5 parts by weight of sodium alginate,
20 parts by weight of triethanolamine,
20 parts by weight of octylphenol polyglycol ether and
900 parts by weight of water.

The fabric squeezed out to a content of about 100% impregnation liquor is dried at 100° and then is fixed for 30 seconds at a temperature of 210°. The dyed goods are rinsed with water, soaped and dried. Under these conditions, a yellowish red dyeing is obtained which is fast to washing, rubbing, light and sublimation.

The dyestuffs described in the other examples produce dyeings of equal quality by this process.

EXAMPLE 66

2 g. of the dyestuff produced according to Example 4 are dispersed in 4000 g. of water. 8 g. of oelic acid-N-methyl tauride are added to this dispersion and 100 g. of cellulose-2½-acetate yarn are dyed for 1 hour at 80°. The dyeing is rinsed and then dried.

In this way, an orange dyeing is obtained which is fast to perspiration, rubbing and light.

We claim:

1. A dyestuff of the formula

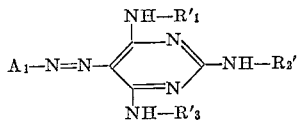

wherein
$A_1$ represents a member of the group of
  (1) a phenyl radical substituted as follows:
    (a) by, as first substituent, a nitro group;
    (b) by a second substituent selected from hydrogen, nitro, cyano, chlorine, bromine, lower alkyl, lower alkoxy, phenoxy, lower alkylsulfonyl, phenoxysulfonyl, lower alkylphenoxysulfonyl, lower alkoxycarbonyl, hydroxy-lower alkoxycarbonyl and a substituent of the formula

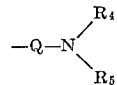

wherein
Q represents —$SO_2$— or —CO—;
$R_4$ represents hydrogen, lower alkyl, hydroxy-lower alkyl, lower alkoxy-lower alkyl, phenyl, benzyl or cyclohexyl; and
$R_5$ represents hydrogen, lower alkyl or hydroxy-lower alkyl; and
    (c) by a third substituent selected from hydrogen, chlorine or bromine; and
  (2) a benzothiazolyl-(2) radical which is unsubstituted or substituted by chlorine, bromine, cyano, nitro, thiocyano, lower alkyl, lower alkoxy, lower alkylsulfonyl, or a grouping

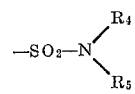

wherein
$R_4$ represents hydrogen, lower alkyl, hydroxy-lower alkyl or lower alkoxy-lower alkyl, phenyl, cyclohexyl or benzyl and
$R_5$ represents hydrogen, lower alkyl or hydroxy-lower alkyl,
one of the groupings —$R_1'$, —$R_2'$ and —$R_3'$ represents alkyl or phenyl alkyl wherein the alkyl group has from 2 to 5 carbon atoms substituted by from one to two of the following: hydroxy, lower alkoxy, cyclohexyloxy, benzyloxy, phenyloxy, substituted phenoxy the substituents being selected from the group of (i) lower alkyl, (ii) lower alkoxy, (iii) chlorine and (iv) bromine, lower alkanoyloxy, benzoyloxy, lower alkoxy-carbonyloxy, phenyl-sulfonyloxy and lower alkyl-phenyl-sulfonyloxy; and
each of the remaining (R')'s represents lower alkyl, cyclohexyl, benzyl, hydroxy-lower alkyl, lower alkoxy-lower alkyl or lower alkanoyloxy-lower alkyl.

2. A dyestuff in accordance with claim 1, wherein $A_1$ represents a benzothiazolyl-(2) radical.

3. A dyestuff in accordance with claim 1, wherein $A_1$ represents a phenyl radical.

4. A dyestuff as defined in claim 3, wherein said nitro group substituent of $A_1$ is in o- or p-position relative to the azo bridge at the said phenyl radical.

5. A dyestuff as defined in claim 2, wherein each of $R_4$ and $R_5$ represents lower alkyl.

6. A dyestuff as defined in claim 3 which is of the formula

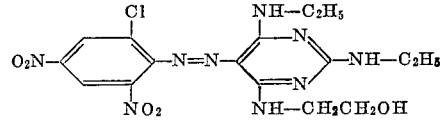

7. A dyestuff as defined in claim 3 which is of the formula

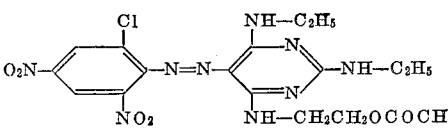

8. A dyestuff as defined in claim 2, which is of the formula

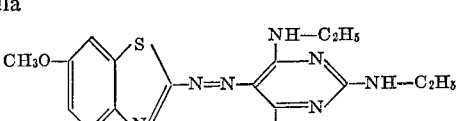

9. A dyestuff as defined in claim 3, which is of the formula

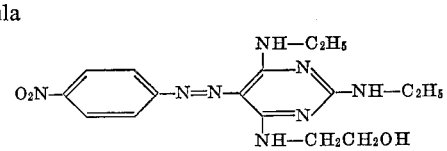

References Cited

UNITED STATES PATENTS 3,042,648  7/1962  Lewis _____ 260—154

CHARLES B. PARKER, Primary Examiner

D. M. PAPUGA, Assistant Examiner

U.S. Cl. X.R.

8—26, 41, 50, 54, 54.2, 55; 106—22, 288; 260—2564, 2565